United States Patent
Pennell et al.

(10) Patent No.: US 10,540,215 B2
(45) Date of Patent: Jan. 21, 2020

(54) INTEROPERABILITY BETWEEN A HOST APPLICATION AND AN EMBEDDED TARGET APPLICATION

(71) Applicant: Microsoft Technology Licensing, LLC, Redmond, WA (US)

(72) Inventors: Andrew M. Pennell, Kirkland, WA (US); Siu Yu Cherie Quek, Redmond, WA (US); Ankit Saraf, Bellevue, WA (US); Yasser Shaaban, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 15/995,054

(22) Filed: May 31, 2018

(65) Prior Publication Data

US 2019/0012216 A1    Jan. 10, 2019

Related U.S. Application Data

(60) Provisional application No. 62/529,531, filed on Jul. 7, 2017.

(51) Int. Cl.
  *G06F 9/54* (2006.01)
  *G06F 3/0484* (2013.01)
  *H04L 29/06* (2006.01)

(52) U.S. Cl.
  CPC ............ *G06F 9/541* (2013.01); *G06F 3/0484* (2013.01); *G06F 9/542* (2013.01); *G06F 9/546* (2013.01); *H04L 69/08* (2013.01)

(58) Field of Classification Search
  CPC ................................. G06F 9/546; G06F 9/547
  USPC ................................................... 719/311, 313
  See application file for complete search history.

(56) References Cited

U.S. PATENT DOCUMENTS

| 6,340,977 | B1 | 1/2002 | Lui et al. |
| 8,731,151 | B2* | 5/2014 | Vasudev ............ H04M 7/0018 379/265.01 |
| 8,978,046 | B2 | 3/2015 | Faludi |
| 9,804,834 | B1* | 10/2017 | Lopyrev ............ H04L 67/1097 |
| 2004/0193759 | A1 | 9/2004 | Scott et al. |
| 2013/0166047 | A1 | 6/2013 | Fernandez et al. |
| 2016/0085439 | A1 | 3/2016 | Threlkeld et al. |
| 2018/0203995 | A1* | 7/2018 | Yuen .................... G06F 21/556 |

FOREIGN PATENT DOCUMENTS

CN     102129364 A     7/2011

OTHER PUBLICATIONS

"Incorporating jabber guest within your application", Cisco DevNet, Retrieved Jul. 7, 2017, 2 pages. https://developer.cisco.com/site/jabber-guestsdk/guestsdk/getting-started/.

Gallagher, et al., "JSON-RPC 2.0 cross-domain communication over postMessage", Retrieved Jul. 7, 2017, 4 Pages. https://github.com/necolas/xdm.js?utm_source=recordnotfound.com.

* cited by examiner

*Primary Examiner* — Andy Ho
(74) *Attorney, Agent, or Firm* — Mannava & Kang, P.C.

(57) ABSTRACT

An integrated application environment includes a host web application executed in a browser, and a target application embedded in a container of the host web application. Interoperability layers facilitate messaging between the host web application and a host entity object of the target application in the container according to multiple communication protocols.

20 Claims, 7 Drawing Sheets

INTEROPERABILITY BETWEEN A HOST APPLICATION AND AN EMBEDDED TARGET APPLICATION

PRIORITY

The present application claims priority to U.S. provisional patent application Ser. No. 62/529,531, filed Jul. 7, 2017, which is incorporated by reference in its entirety.

BACKGROUND

Application interface technologies may be used to provide interoperability between software applications, but can be complex. For example, Component Object Model (COM) is a well-established technology that enables disjoint pieces of software to interoperate. In COM, a developer writes components that can offer functionality to other software, by exposing method interfaces with a globally unique identifier (GUID) that is known to both parties, and that can consume functionality from other software, by querying for available implementations of method interfaces by their known GUIDs. Writing these COM components can be difficult especially for non-programmers.

Furthermore, application development environments are available for business users to create applications. For example, declarative application development environments provide an easy way to create declarative applications. Declarative application environments often employ graphical user interfaces that allow a user with minimal programming skills to create a declarative application through drag and drop operations or through other declarative programming operations. However, declarative applications have traditionally been very constrained in terms of allowing interoperability with other pieces of software on a user's computer, and programming COM components can be difficult especially for non-programmers.

SUMMARY

According to an embodiment of the present disclosure, an application is embedded in a host application. The application embedded in the host application is referred to as a target application. The target application may be a declarative application, which may be created through declarative programming. The target application can expose its properties, events and functions to the host application through a specialized entity, e.g., an object, in the target application. The specialized entity is referred to as a host entity or a host entity object, and it exposes properties, events and functions of the target application to the host application. The target application may interact with the host entity using properties of the host entity. Also, expressions of the target application may be used to handle events triggered by the host application.

According to an embodiment, interoperability layers facilitate communication between the host application and the target application. The interoperability layers facilitate parameter passing and data exchange between the host application and the target application. In an example, the host application and the target application are web applications that can be executed in a browser. The target application may be embedded in the host application. For example, the target application is hosted and executed in a container of the web page running the host application, as is further discussed below. The interoperability layers facilitate communication between the host application running in the browser and the target application running in a container of the host web application. In an example, the target application may be a declarative application, but the target application is not limited to declarative applications. Also, the host application may be a document management and storage system or another type of application. The host application may provide a data source for the declarative application.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Figure 1:
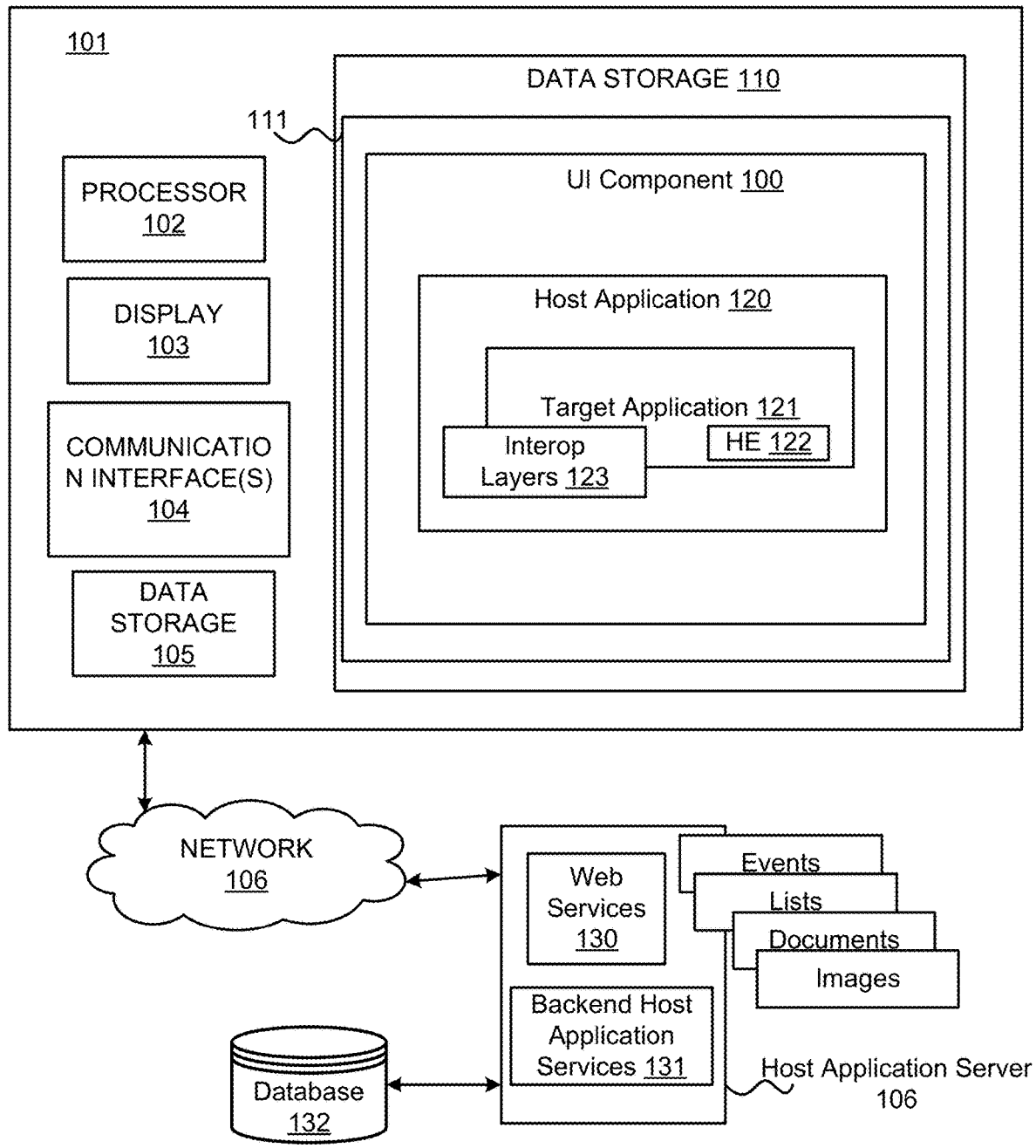
FIGS. 1 and 2 show computing environments for a target application embedded in a host application, according to embodiments.

FIG. 1 illustrates a computing environment for target application 121 and host application 120. The computing environment may include computer 101. The computer 101 may include a processor 102 and a data storage device 110 on which is stored machine-readable instructions 111 that the processor 102 may fetch and execute. The processor 102 may be a semiconductor-based microprocessor, a central processing unit (CPU), an application specific integrated circuit (ASIC), a field-programmable gate array (FPGA), and/or other hardware device. The data storage device 110 may be a non-transitory computer readable medium comprised of an electronic, magnetic, optical, or other type of physical storage that stores the machine-readable instructions 111. The data storage device 110 may be, for example, Random Access Memory (RAM), an Electrically Erasable Programmable Read-Only Memory (EEPROM), a storage device, an optical disc, and the like. The data storage device 110, which may also be referred to as a computer readable storage medium, may be a non-transitory machine-readable storage medium, where the term "non-transitory" does not encompass transitory propagating signals. The processor 102 may include one or more processors. The computer 101 may include a display 103 and/or another type of input/output (I/O) device, such as a keyboard, mouse, pen, voice input device, touch input device. The computer 101 may include additional data storage 105, which may be non-volatile. The computer 101 may include additional components not shown.

The computer 101 may also include communication interface(s) 104 that allows the computer 101 to communicate with other computers, such as host application server 106. Communication interface(s) 104 may include, but is not limited to, a modem, a Network Interface Card (NIC), an integrated network interface, a radio frequency transmitter/receiver, an infrared port, a USB connection, or other interfaces. The communication interface(s) 104 may connect with other computers via a wired connection or a wireless connection. The communication interface(s) 104 may include a network interface to connect with other computers, including the host application server 106, via network 106. The network 106 may comprise one or more of the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks. The network 106 may be a network in a cloud computing environment.

The processor 102 may fetch and execute the machine-readable instructions 111 to execute user interface (UI) component 100, host application 120, target application 121 which includes host entity 122, shown as HE 122, and one or more interoperability layers 123, shown as Interop Layers 123. One or more of the components shown inside 111 in FIG. 1 may be referred to as an integrated application environment hosted on the computer 101. The UI component 100 enables a user to interact with host application 120 and target application 121 and also enables access of one or more services of host application server 106, which may include retrieving electronic list item structures, viewing list item structures, editing list item structures, creating list item structures, etc., as is further discussed below.

The target application 121 is embedded in the host application 120. For example, the target application 121 runs inside the host application 120. The interoperability layers 123 enable communication and data exchange between the host application 120 and the embedded target application 121 as is further discussed with respect to FIG. 2. Also, the target application 121 may include host entity 122. The host entity 122 exposes properties, events and functions of the host application 120 to the target application 121, and is also used to expose properties, events and functions of the target application 121 to the host application 120 via host interoperability layers 123 as is further discussed below.

The host application 120 and the target application 121 may communicate with the host application server 106 via the network 106 to consume services of the host application 120. In an embodiment, the host application 120 and the target application 121 are web applications that run in a browser. For example, the UI component 100 is a browser, and the host application 120 runs in a web page rendered in the browser. For example, backend host application services 131 may serve web pages via web services 130 for the host application 120 to the UI component 100, e.g., browser, of the computer 101. The backend host application services 131, for example, is the backend services for the host application 120. The target application 121 may be displayed inside a UI component of the browser. For example, a graphical user interface for the target application 121 may be shown in an iframe in the web page of the host application 120. An iframe (short for inline frame) may include an HTML element that allows an external webpage to be embedded in an HTML document. The iframe may be a window of programmable size that displays the graphical user interface for the target application 121. The graphical user interface for the target application 121 may display forms or other UI screens to perform data operations including viewing and editing list items.

In an example, the host application 120 is a web application for a collaboration system. For example, the host application server 106 comprises one or more servers (e.g., web server, collaboration server, database server, etc.) for the collaboration system. The collaboration system may enable users to collaborate and share content. For example, the collaboration system may be a web-based collaboration tool that facilitates document sharing, management and storage, and may be customizable for the needs of its users. SharePoint® is an example of the collaboration system.

Data from data sources may be presented through the host application 120 and the target application 121. The host application 120 and/or the target application 121 may allow the data to be viewed, edited, deleted, etc. Examples of data sources may include tables which may be in a spreadsheet, database, etc. Data sources other than tables may include email, calendars, social media feeds, notifications, delimited files, etc. Data sources may be located remotely, such as on a cloud, or may be local to the application. An example of a data source is a list. For example, the collaboration system may store electronic list data structures, shown as lists. The lists may include items and the items may be displayable. The lists may be used as data sources for the target application 121. The collaboration system allows a user to create and share a list with other users, and the other users may be given privileges to view and/or edit the list. A list may be a data structure to store information. In an example, the list may include list items. For example, the list may be similar to a database or table, with rows, and each row may be a separate list item in the list.

In an example, the target application 121 may be created to consume list items in a list stored on the host application server 106. The list may be a data source for the target application 121. For example, assume the list comprises information for cities and maps. For example, each list item includes a city and a map for the city. The target application 121 may be executed on the computer 101 to allow a user to view information the list items about the cities and to view the maps in a manner that is easy to read and navigate. Furthermore, the target application 121 may allow the user to select data items on the list, edit the data items, and/or create new data items. As indicated above, the target application 121 is embedded in the host application 120. The user may access the list via the host application 120. For example, the user may log into the host application 120 with authorized credentials. A web page of the host application 120 is displayed and may include the list. The target application 121 may be loaded in the host application 120 to perform a list action, such as adding, deleting, or editing an item on the list or otherwise interacting with the list. The target application 121 may be a declarative application, such as a PowerApps® application.

Figure 2:
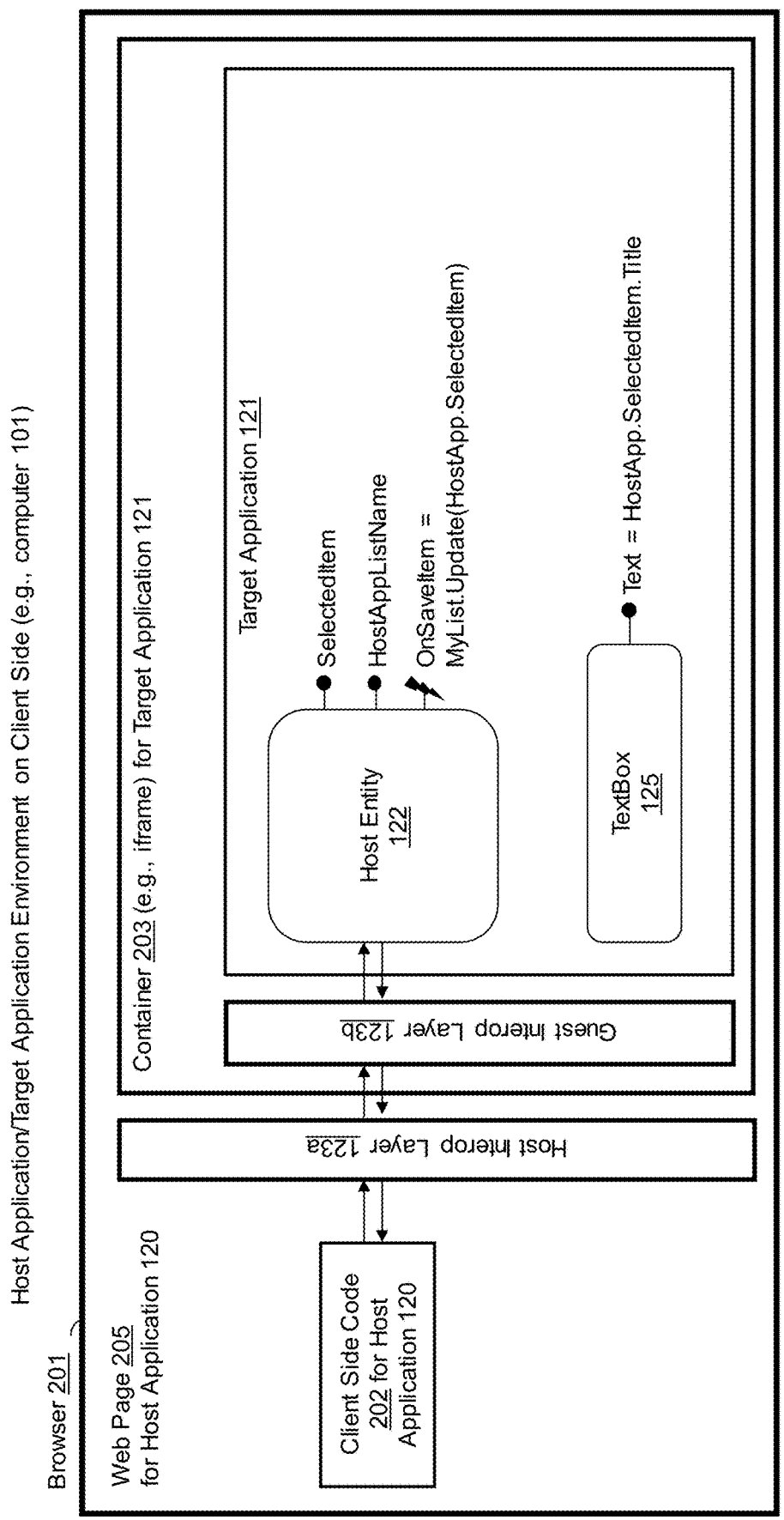

FIG. 2 shows a computing environment for the host application 120 and the target application 121. The computing environment may be on a client side, such as provided in the computer 101, of the host application 120. The components shown in FIG. 2 may include code that is part of the machine-readable instructions 111 shown in FIG. 1.

The host application 120 may include a web application with client-side code 202 running on the computer 101 and server-side code running on the host application server 106.

As shown in FIG. 2, the client-side code 202 of the host application 120 may be executed in browser 201 which may be running on the computer 101. For example, a web page 205 of the host application 120 is accessed via the browser 201 and includes code 202. The target application 121 is embedded in the host application 120. For example, as shown in FIG. 2, the target application 121 may be hosted in a container 203 of the client-side host application 120. For example, the container 203 may be a sandbox that has limited permissions for executing the target application 121 therein. In an example, the container 203 is an iframe. The container 203 may have a limited set of permissions. For example, all possible permissions for the container 203 are not granted and only approved permissions may be added as flags in the container's configuration. Accordingly, the target application 121 is executed in the container 203 to provide a measure of separation between the host application 120 and the target application 121.

The interoperability layers 123 shown in FIG. 1 may include interoperability layers 123a-b, shown in FIG. 2, that facilitate communication and data exchange between the host application 120 and the target application 121 hosted in the container 203. The interoperability layers 123a-b may include code that facilitates communication and data exchange between the host application 120 and the target application 121 according to predetermined protocols. Guest interoperability layer 123b facilitates communication from outside the container 203 to inside the container 203 and vice versa. Host interoperability layer 123a facilitates communication between the guest interoperability layer 123b and the client-side code 202. As is further discussed below, the protocols of the interoperability layers 123a-b work together to facilitate communication between the target application 121 executed in the container 121 and the client-side code 202 of the host application 120 running outside the container 203.

In an example, the container 203 may be an iframe, and the guest interoperability layer 123b may use iframe post-Message for messaging between the target application 121 and the host interoperability layer 123a. Iframe postMessage is an application program interface for web messaging or cross-document messaging that allows documents to communicate with one another across different origins or across different source domains while rendered in a web browser. Section 9.4 of the HTML 5 specification published by the World Wide Web Consortium describes postMessage. Post-Message is used for communicating messages and data between the target application 121 and the host interoperability layer 123a through the container, e.g., through the iframe, boundary. Messages communicated according to postMessage are referred to below as post messages or iframe post messages.

The host interoperability layer 123a may be a software development kit (SDK) that executes a communication protocol for communicating between the guest interoperability layer 123b and the code 202 of the host application 120. In an example, the SDK may be a JavaScript® SDK. The host application 120 may not understand iframe post messages from the guest interoperability layer 123b. The SDK of the host interoperability layer 123a executes a communication protocol that is understood by the code 202 of the host application 120 to allow interoperability between the host application 120 and the target application 121. For example, the SDK of the host interoperability layer 123a may include a set of functions that allow data and messages to be exchanged with the code 202 of the host application 120. For example, the host interoperability layer 123a may perform call backs and other procedures to facilitate the communication.

The host entity 122 exposes properties, events and functions of the host application 120 to the target application 121, and is also used to expose properties, events and functions of the target application 121 to the host application 120 via the host interoperability layer 123a. For example, the host entity 122 may expose a list and items on the list, which may be stored or managed by the host application server 106, to the target application 121. Also, the host entity 122 may expose actions that can be performed on the lists, such as view, edit save, etc. Text box 125 may be used in the target application 121 to display information about exposed properties, events and functions of the host application 120. For example, the text box 125 may display a selected item of a list from the host application 120 or another value provided by the host application 120. The target application 121 may interact with the host entity 122 by using properties of the host entity 122. For example, expressions used by the target application 121 may incorporate properties of the host entity 122. Also, the target application 121 may write and/or execute expressions to handle events triggered by the host application 120.

Figure 3:
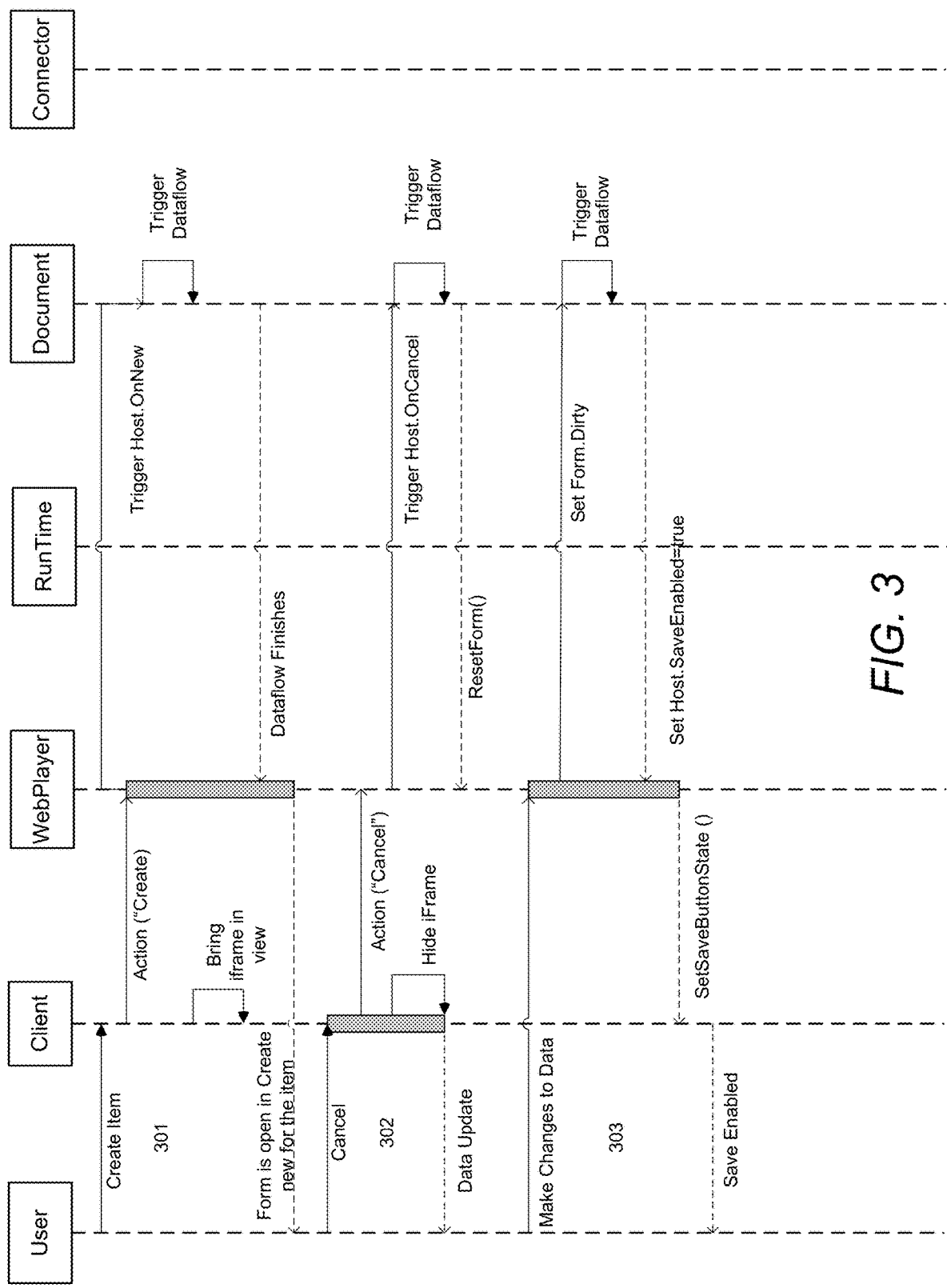
FIGS. 3-4 show data flows for messaging and data exchange between the target application and the host application, according to embodiments.
Figure 4:
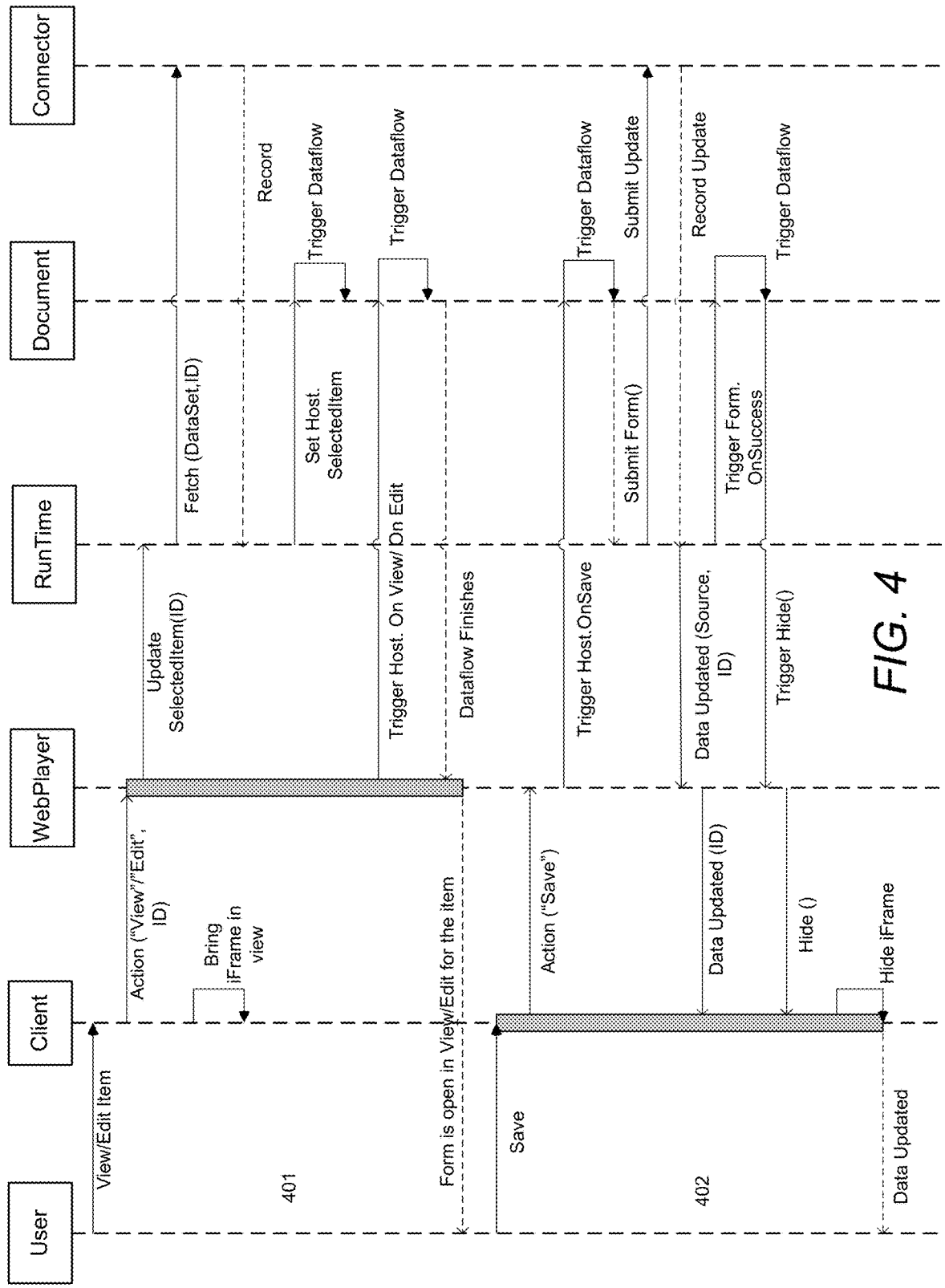

FIGS. 3-4 show examples of data flows between the client side code 202 and the target application 121. Assume the target application 121 is running in an iframe of the host application 120. Assume the target application 121 is executed to perform particular list actions. The client shown in FIGS. 3-4 includes the client side code 202 shown in FIG. 2 and also represents communications for the host interoperability layer 123a. In an example, the client is a Share-Point® Online client and by way of example the code 202 may be for SharePoint® Online. However, the code 202 may be for a host application other than SharePoint® Online. The web player shown in FIGS. 3-4 represents the container boundary of the container 203, and messages shown as being sent to or from the web player may be iframe post messages assuming the container 203 is an iframe. Runtime and document shown in FIGS. 3-4 represent the guest interoperability layer 123b and target application 121 with host entity 122. The connector is a mechanism to connect to a backend, such as the host application server 106, from the target application 121.

Data flow 301 shown in FIG. 3 includes a data flow for creating an item in a list of the host application 120. A user may view the list through the client-side code 202 of the host application 120 running in the browser 201. The target application 121 may be executed to perform a variety of operations on the list, such as creating a list item, editing or viewing list items, etc. The user may select a control, such as clicking a button in the web page of the host application 120, to create a new item for a list displayed by the host application 120. This triggers loading of the target application 121 in an iframe created by the webplayer. The action "create" message is sent to the target application 121, so the target application 121 knows to show a form for creating a new item. For example, the target application 121 is a declarative application built with a form that can be displayed to perform an operation on a list item, such as create item, edit, view, etc. The action "create" message may be a post message sent from the host interoperability layer 123a to the guest interoperability layer 123b to create a list item for a particular list. The trigger.host.onNew message may be created by the guest interoperability layer 123b. This message is sent to the host entity 122 to trigger a dataflow inside target application 121 to create a new list item. For example, a form is opened in the target application 121 for creating a new list item. The form may include fields for the list with empty text boxes that can be populated by the user. The form is displayed to the user.

FIG. 3 also shows a dataflow 302 for canceling a list item update. A cancel action message is sent to trigger canceling an update. The action "cancel" message may be a post message sent from the host interoperability layer 123a to the guest interoperability layer 123b to cancel a list item update. The trigger host.onCancel message is created by the guest interoperability layer 123b and sent to the host entity 122 to trigger a dataflow inside the target application 121 to cancel the list item update. For example, a ResetForm function is executed to reset the contents of a form to its initial values, before the user made a change to the list item, whereby the change was subsequently canceled. The list may then be shown by the host application 120 to the user with its initial values before the user made the change to the list item. The iframe containing the target application 121 may be hidden.

FIG. 3 also shows a dataflow 303 for making changes to a list item and enabling a save operation. For example, a form for making changes is open in the target application 121 and the user makes changes to data in the form. In an example, the user makes a change to a list item displayed in a form presented by the target application 121. The form is now considered dirty due to the change of the list item, and a dataflow is triggered to enable saving the change to the list item. A variable in the target application for save enabling is set to true, for example, to facilitate the ability of the user to select a button to save the change to the list item if the user so desires in the host application 120. Thus, the ability to save the change is enabled. The SetSaveButtonState variable may be set to enable the ability to click a save button.

FIG. 4 shows a data flow 401 for viewing or editing a list item. For the data flow 401, a user clicks a button in the host application 120 to view or edit an item. An action message is sent from the host application 120 to the target application 121 to view or edit the item along with the item ID. The action message may be a post message sent from the host interoperability layer 123a to the guest interoperability layer 123b indicating to view or edit a list item identified by the provided item ID. UpdatedSelectedItem(ID) triggers display of the selected list item. For example, a form is opened in the target application 121 for viewing or editing the list item. The target application 121 can get the list item for displaying in the form from a backend, e.g., host application server 106, via the connector through the Fetch(DataSet, ID) operation, or the item can be obtained from the host application 120 by messaging through the host interoperability layers 123a. The form is populated with the information for the list item to be viewed or edited. The user may view or edit the information in the form, which is displayed in the target application 121 embedded in the host application 120.

After the user edits the list item, the user may save the changes to the list item. Dataflow 402 shows actions and messages for saving the changes. For example, the user clicks a save button in the host application 120, and a save action is done by sending a save action message to trigger a data flow in the target application 121 for saving changes to an item as shown in FIG. 4. A data item for which changes are being saved may be obtained by the target application 121 via the connector or through messaging with the host application 120 via the layers 123a-b. The iframe is hidden when the save operation is completed, and the data is refreshed in code 202.

Figure 5A:
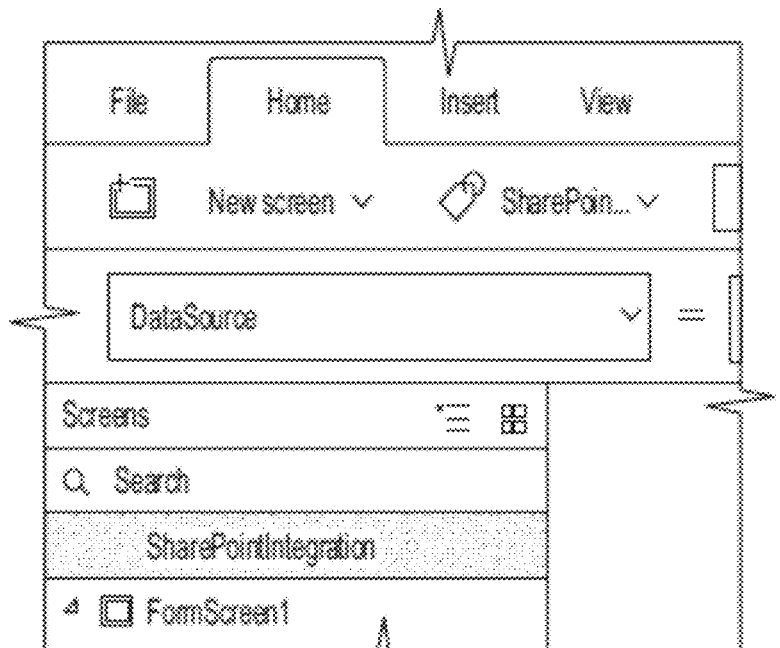
FIGS. 5A-C show screenshots of a graphical user interface for the target application, according to embodiments.
Figure 5B:
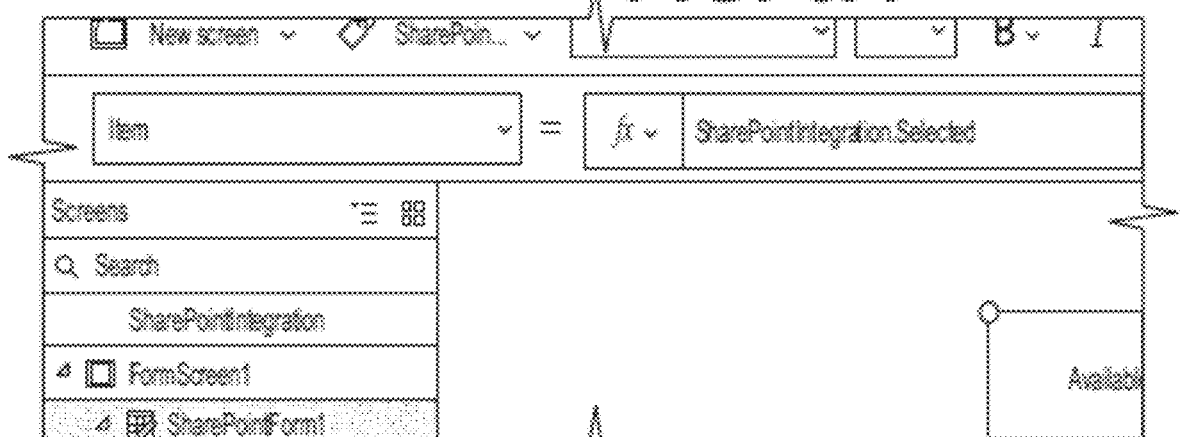
Figure 5C:
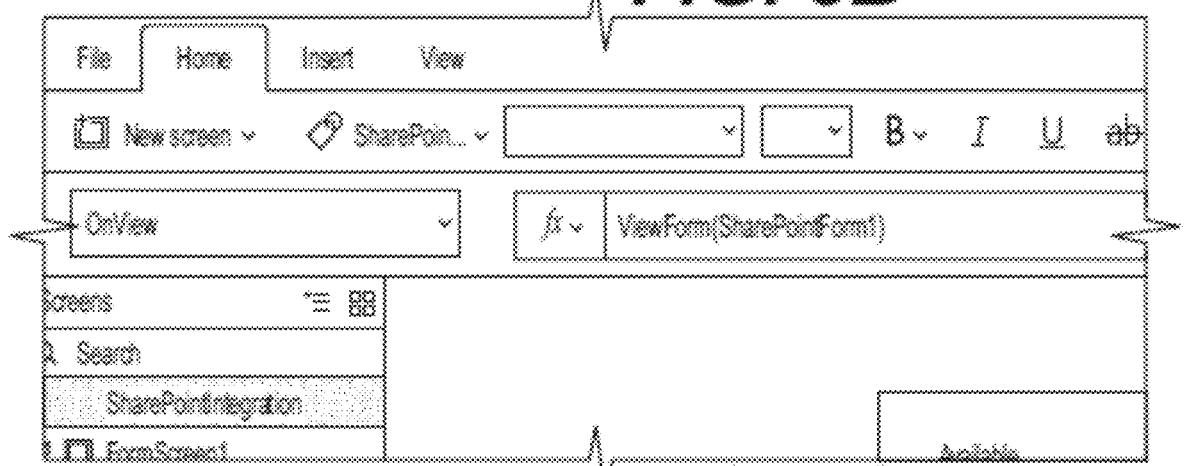

The target application 121 may be a declarative application created through declarative programming. Declarative programming is a technique of programming the structure and elements of a computer program that expresses the logic of a computation without describing its control flow. For example, a declarative programming language may allow a user to program a declarative application by describing what the application must accomplish in terms of the problem domain, rather than describe how to accomplish it as a sequence of programming language primitives. PowerApps® is an example of a declarative programming tool for creating declarative applications. In an example, the target application 121 includes graphical user interface forms displayable to perform data operations triggered by the host web application, such as forms that may be displayed to view or edit list items. FIGS. 5A-C show screenshots of a graphical user interface of a declarative programming tool for creating the target application 121 with host entity 122, according to embodiments. As shown in FIGS. 5A-C, the declarative programming tool has the ability to include host entity objects in a declarative application to facilitate communication and data exchange between the target application 121 and the host application 120 via the layers 123a-b. FIGS. 5A-C are described by way of example as having the host application 120 being SharePoint® and the target application 121 being a PowerApps® application.

FIG. 5A shows that the host entity object (e.g., host entity 122), shown as SharePointIntegration, is a control that can be selected by a developer to be included in the target application 121. A data source for the SharePointIntegration may also be selected through this screen. In an example, the data source for the SharePointIntegration object may include a list, but may also include a list item or a field associated with a list item. FIG. 5B shows that a form may be selected for display in the target application 121 responsive to receiving, via the SharePointIntegration object, a list item from the list that is selected as the data source. For example, as shown in FIG. 5B, SharePointForm1 is a form that is selected to show the list item sent from the host application 120. FIG. 5C shows that the developer tool allows a developer to set a rule that can be triggered responsive to receiving an action in an action message, such as a message for an action to create, cancel, view, edit, etc., such as shown in FIGS. 3 and 4. In particular, FIG. 5C shows setting a form to view a list item (e.g., ViewForm(SharePointForm1)), rather than setting a form to edit or create the list item.

Examples of code for facilitating the communication and data exchange between the target application 121 and the host application 120 are now described. In these examples, the host application 120 is SharePoint® and the target application 121 is a PowerApps® application. A first step may include embedding the target application 121 in the host application. The host application 120 may create an embedding type object in the host application 120 and then render it. An example of code for creating the embedding type object is as follows:

```
var embedPowerApps = new WebPlayer.Sdk.PowerAppsEmbedding({
    appId: this._powerAppsSettings.appInfo.appId,
    containerId: this._webPlayerContainerId,
    hostName: hostName,
});
embedPowerApps.renderApp( );
```

The code specifies for the embedding type object, the following: appID of the target application 121; a container identifier for executing the target application 121 therein; and a hostname. The hostname refers to a PowerApps® endpoint. For example, a hostname may specify an endpoint for a testing platform or a production platform.

The next step is to execute the target application 121, which is identified by the appID in the embedding type object, in a container of the host application 122, whereby the container is identified by the container identifier in the embedding type object. For example, a message is sent from the host interoperability layer 123a to the target application 121 via the guest interoperability layer 123b with the action type and other parameters to trigger an action in the target application 121, such as displaying a view form to view a list item. The message may be a post message. Below is an example of code for sending a view action message and a list item ID:

```
    var params:
WebPlayer.Sdk.IPowerAppsEmbeddingActionOptions = {
        itemId: itemId
};
embedPowerApps.executeAction(WebPlayerSDKViewAction,
params);
```

A message may be sent for other types of actions, such as an action for create, edit, cancel, etc. In response to receiving the view action message described above, the guest interoperability layer 123b may generate a message to send to the host entity 122 that includes expressions and variables exposed and understood by the host entity 122, such as described above with respect to FIGS. 3 and 4. The host entity 122 may trigger a data flow in the target application 121 based on a received message from the guest interoperability layer 123b. For example, the message may include trigger Host.OnView to trigger a dataflow to view a selected list item in target application 121.

Figure 6:
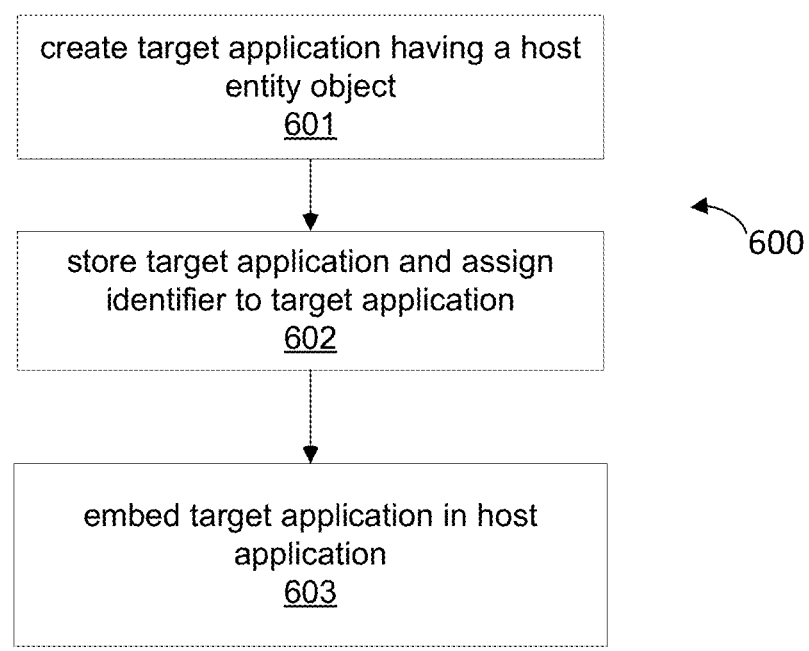
FIGS. 6-7 show methods, according to embodiments.
Figure 7:
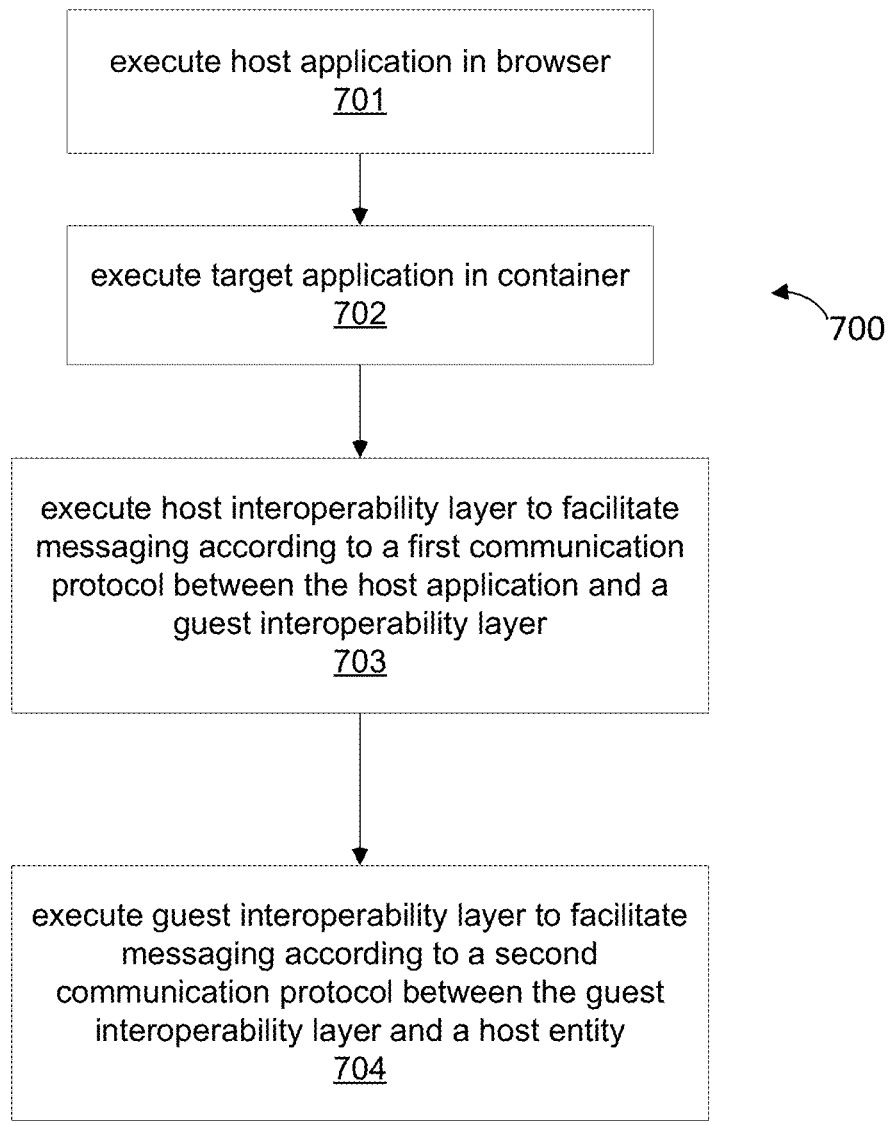

FIGS. 6 and 7 show methods according to embodiments. The methods may be performed by one or more computers, such as the computer shown in FIG. 1. The methods may be embodied in machine readable instructions stored on at least one non-transitory computer readable medium and executed by at least one processor.

FIG. 6 shows a method 600 for embedding a target application in a container of a host web application. At 601, a target application, such as the target application 121, is created with a host entity object, such as the host entity 122. FIGS. 5A-C show examples of screen shots for creating a target application that is a declarative application, and for including a host entity object in the target application. The host entity object, e.g., host entity 122, can expose properties of the host entity object to trigger associated data flows in the target application. The properties may include data operation properties describing data operations executable by the target application 121 on a data item, such as a list item. The properties may be included in messages from the guest interoperability layer 123b to the host entity 122 to trigger data operations executed by the target application 121, and examples of the messages are shown in FIGS. 3 and 4. Examples of the properties of the host entity object may include Selected, OnNew, OnView, OnEdit, OnSave, OnCancel, and SelectedListItemID, most of which are described above with respect to the examples in FIGS. 3 and 4. For example, SelectedListItemID identifies a list item that may have been selected in the host application 120; OnNew triggers a dataflow in the target application 121 in response to a user clicking a create item button in the host application 120; OnView triggers a dataflow in the target application 121 in response to a user clicking a button in the host application 120 to view an item's details; OnEdit triggers a dataflow in the target application 121 in response to a user clicking an edit item button in the host application 120; OnSave triggers a dataflow in the target application 121 in response to a user clicking a save item button in the host application 120; and OnCancel triggers a dataflow in the target application 121 in response to a user clicking a cancel button in the host application 120.

At 602, the target application 121 is stored and is assigned an ID. At 603, the target application 121 is embedded in the host application 122. For example, an embedding type object is created in the host application 120. The embedding type object may include the target application ID, so the target application 121 can be identified and executed. After the target application 121 is embedded in the host application 122, the target application 121 may be executed in a container of the host application 122, such as described in the example above.

In an example, the host application 120 includes the host interoperability layer 123a, and the target application 121 includes the guest interoperability layer 123b. For example, the host interoperability layer 123a may include an SDK in the host application 120 that implements a first communication protocol to facilitate data exchange and messaging to or from the host application 120, and the guest interoperability layer 123b may include code of the target application 121 that implements a second communication protocol to facilitate data exchange and messaging to or from the target application 121.

FIG. 7 shows a method 700 for facilitating bi-directional communication between the host application 120 and the target application 121. At 701, a host application, such as the host application 120, is executed in a browser. The host application is a web application.

At 702, a target application, such as the target application 121, is executed in a container of the host application 120. As is discussed above, the host application 120 may create an embedding type object for the target application which renders the target application 121 in a container, such as an iframe, in the host application 121 while the host application is executed in the browser. The target application 122 may be loaded in the container responsive to a message from the host application 120.

At 703, a host interoperability layer, such as the host interoperability layer 123a, is executed to facilitate messaging according to a first communication protocol between the host web application 120 running in the browser and a guest interoperability layer, such as the guest interoperability layer 123b. The first communication protocol includes operations performed by the host interoperability layer 123a to facilitate execution of data operations or other functions in the target application 121. For example, the host interoperability layer 123a generates messages, such as Action("Create"), Action("Cancel"), Action("View/Edit"), Action("Save"), etc., to view, edit, create, save edits, canceling edits, etc. for a data item, such as a list item, through the target application 121. The host interoperability layer 123a may generate the messages in response to user actions performed in the host application 120, such as clicking a save button, edit button, etc., or in response to other functions performed in the host application 120. The messages may be generated according to a particular application program interface, such as post messages, that allows messages to be transmitted to or from the container to outside the container. The first communication protocol may also include operations performed by the host interoperability layer 123a to facilitate execution of data operations or other functions in the host application 120, such as in response to messages received from the guest interoperability layer 123b. Examples of the data operations or other functions are shown in FIGS. 3 and 4, such as updating data in response to a cancel in the host application 120, or enabling a save button in the host application 120. The host interoperability layer 123a may perform call backs and other functions to execute the first communication protocol.

At 704, a guest interoperability layer, such as the guest interoperability layer 123b, is executed to facilitate messaging according to a second communication protocol between the guest interoperability layer 123b and the host entity 122. The second communication protocol is different than the first communication protocol. For example, the second communication protocol includes different functions than the first second communication protocol. For example, the second communication protocol may include receiving messages to trigger data operations in the target application 121 from the host interoperability layer 123a, such as messages, e.g., Action("Create"), Action("Cancel"), Action("View/Edit"), Action("Save"), etc., to view, edit, create, save edits, canceling edits, etc. for a data item, and generating messages according to the properties of the host entity 122, such as Selected, OnNew, OnView, OnEdit, OnSave, OnCancel, and SelectedListItemID. The messages including properties of the host entity 122 may be transmitted from the guest interoperability layer 123b to the host entity 122 to trigger data flows in the target application 121 to execute data operations on a data item selected in the host application 120. The host entity 122 may also communicate with the guest interoperability layer 123b according to the second communication protocol to convey information from the target application 121 to the host application 120.

Embodiments and examples are described above, and those skilled in the art will be able to make various modifications to the described embodiments and examples without departing from the scope of the embodiments and examples.

What is claimed is:

1. A system comprising:
    at least one processor; and
    at least one non-transitory computer readable medium storing machine readable instructions executable by the at least one processor to:
        execute a host web application in a browser;
        execute a target application in a container of the host web application;
        execute a host interoperability layer, wherein the executed host interoperability layer facilitates messaging according to a first communication protocol between the host web application running in the browser and a guest interoperability layer in the container; and
        execute the guest interoperability layer, wherein the executed guest interoperability layer facilitates messaging according to a second communication protocol between the guest interoperability layer and a host entity object of the target application.

2. The system of claim 1, wherein the at least one processor is to:
    trigger a data operation in the target application in response to receiving a message from the host web application via the host interoperability layer and the guest interoperability layer.

3. The system of claim 2, wherein the data operation comprises at least one of viewing, editing, creating, saving edits and canceling edits for a data item.

4. The system of claim 1, wherein the host web application and the target application perform data operations on the same data source, and the host web application triggers the target application to perform at least one of the data operations through bidirectional messaging performed via the host interoperability layer and the guest interoperability layer.

5. The system of claim 1, wherein the target application is a declarative application including graphical user interface forms displayable to perform data operations triggered by the host web application.

6. The system of claim 1, wherein the host web application generates a graphical user interface displaying data items from a data source, and the target application is a declarative application that generates a user interface (UI) component in a window of the graphical user interface of the host web application to view or edit one of the data items.

7. The system of claim 6, wherein the UI component displays additional information about the one data item.

8. The system of claim 1, wherein the host entity object exposes properties, of the host entity to the guest interoperability layer to facilitate the second communication protocol.

9. A computer system comprising:
    at least one processor;
    a host web application executed by the at least one processor in a browser;
    a target application executed by the at least one processor in a container of the host web application;
    a host entity object of the target application, the host entity object including data operation properties describing data operations executable by the target application on a data item; and
    a plurality of interoperability layers executed by the at least one processor and facilitating messaging between the host web application and the host entity object of the target application according to a plurality of communication protocols.

10. The computer system of claim 9, wherein the messaging includes a message having at least one of the data operation properties of the host entity object, and the message is sent to the host entity object to trigger execution of the at least one data operation by the target application.

11. The computer system of claim 9, wherein plurality of interoperability layers comprises:
    a host interoperability layer to facilitate communication according to a first communication protocol between the host web application and a guest interoperability layer in the container; and
    the guest interoperability layer to facilitate communication according to a second communication protocol between the guest interoperability layer and the host entity object of the target application.

12. The computer system of claim 11, wherein one of the data operations is triggered in the target application in response to receiving a message at the host entity object from the host web application via the host interoperability layer and the guest interoperability layer.

13. The computer system of claim 9, wherein the data operations comprise viewing, editing, creating, saving edits and canceling edits for the data item.

14. The computer system of claim 9, wherein the data item is from a data source accessible by the host web application and the target application to display the data item.

15. The computer system of claim 9, wherein the target application is a declarative application including graphical user interface forms displayable to perform the data operations triggered by the host web application.

16. The computer system of claim 9, wherein the host web application generates a graphical user interface displaying data items from a data source, and the target application is a declarative application that generates a user interface (UI) component in a window of the graphical user interface of the host web application to view or edit one of the data items.

17. The computer system of claim 16, wherein the UI component displays additional information about the one data item.

18. A computer-implemented method comprising:
   executing a host web application in a browser, wherein the host web application is operable to display data items from a data source in a graphical user interface in the browser;
   executing a target application in a container of the host web application, wherein the target application is operable to display information for at least one of the data items in a window in the graphical user interface of the host web application;
   facilitating, by a host interoperability layer, messaging between the host web application running in the browser and a guest interoperability layer in the container, according to a first communication protocol; and
   facilitating, by the guest interoperability layer, messaging between the guest interoperability layer and a host entity object of the target application, according to a second communication protocol.

19. The computer-implemented method of claim 18, wherein the container is an iframe, and facilitating messaging according to the first communication protocol comprises:
   transmitting a post message from the host interoperability layer to the guest interoperability layer inside the container.

20. The computer-implemented method of claim 18, comprising:
   receiving a message at the guest interoperability from the host interoperability layer according to the first communication protocol, wherein the message is triggered by an action in the host web application invoking a data operation on one of the data items; and
   transmitting a message from the guest interoperability to the host entity object according to the second communication protocol to trigger a data flow in the target application to execute the data operation on the one data item.

* * * * *